United States Patent Office 3,364,736
Patented Jan. 23, 1968

3,364,736
HYDRAULIC DYNAMOMETERS OF THE HYDROKINETIC TYPE
William Nevile Bathurst and Ivor Maurice Jarvis, Worcester, and Brian Patrick Hogan, Bromsgrove, England, assignors to Heenan & Froude Limited, Worcester, England, a British company
Filed Apr. 28, 1965, Ser. No. 451,542
5 Claims. (Cl. 73—134)

ABSTRACT OF THE DISCLOSURE

A testing system for a prime mover in which there is a hydrokinetic dynamometer having an electrical control. The electrical control signal is applied to an electrically operable servo valve which acts as a pressure control on the dynamometer absorption system. The testing system can also include a recording playback unit and closed loop servo-control for running the prime mover through a simulated testing cycle.

---

This invention relates to hydraulic dynamometer systems for testing prime movers where the dynamometer is of the hydrokinetic type.

When a dynamometer is used to test an enging or other prime mover, it is essential that the speed and load shall be controlled in a stable manner, and shall not drift from the set point until the engine or dynamometer control settings are altered.

For the purpose of this specification, "engine" will be used to represent any prime mover.

To ensure that a dynamometer will test an engine satisfactorily it is necessary that the engine and dynamometer instantaneous characteristics should bear the right relationship to one another.

The engine characteristic is defined as the torque speed curve obtained when the engine is set up at a fixed throttle opening, and the speed is varied by changing the load imposed by the dynamometer.

The dynamometer characteristic is defined as the torque/speed curve obtained with a fixed setting of the dynamometer control and varying the speed by changing the throttle setting of the engine.

To ensure stable running it is important that the steepness of the dynamometer characteristic at the testing point should be greater than that of the engine characteristic. Thus maximum stability will be obtained when the engine and dynamometer characteristic curves make an angle of 90° to one another at the testing point.

An exception to this condition is when the speed of the engine is controlled not by the dynamometer, but by its own governor in which case its characteristic becomes a vertical line of constant speed. The dynamometer characteristic should then approximate to a constant torque curve.

Figure 1:
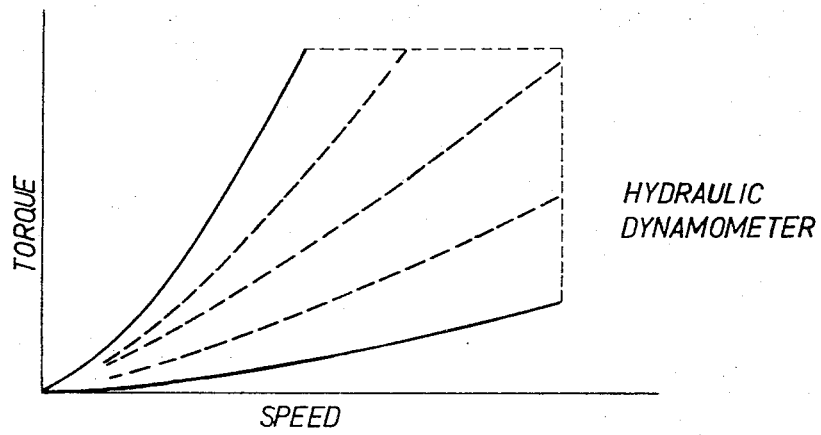

For explanatory purposes, reference will be made to FIGURES 1 and 2 of the accompanying drawings. FIGURE 1 shows a typical family of torque/speed curves obtainable with a conventional hydraulic dynamometer with normal control and it will be seen that these cut a normal petrol engine torque curve sharply and thus give stable running. It will however be noted that the steepness of the dynamometer curve decreases as the minimum power absorption capacity line of the dynamometer is approached and this may cause difficulty with certain types of engine.

Figure 2:
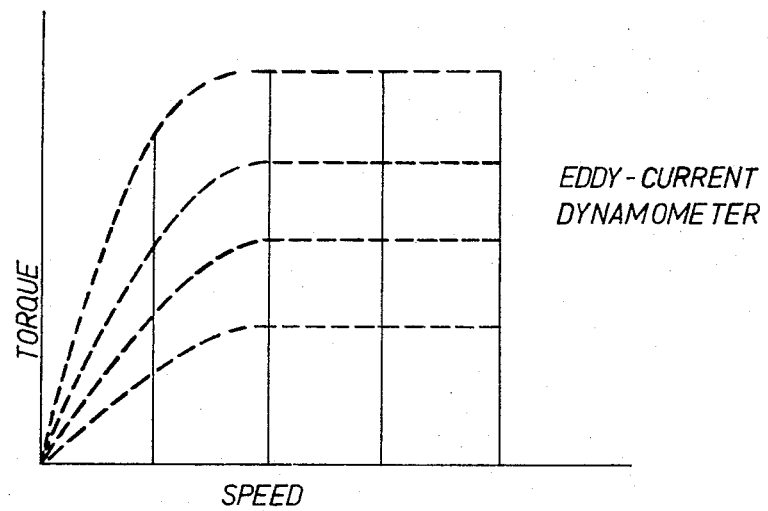

FIGURE 2 shows the two usual characteristics that can be obtained with eddy current and electric dynamometers. The full lines are "constant speed" or governing characteristics. The dotted lines are the characteristics obtained with a series of fixed values of coil excitation with an eddy current dynamometer.

A further important function of an engine test bed is to reproduce accurately and consistently the conditions under which the engine operates in service. A well known example of this is the automobile engine, which in service is subject to variations of torque and speed due to changes in operating conditions of the vehicle such as rolling resistance, gradient, wind resistance, acceleration, speed and gear changing.

Electric and eddy-current dynamometers, are known types having controlling means capable of providing a complexity of torque/speed characteristics, and capable of being programmed to produce any test cycle. However the overall cost and size of these dynamometers is greater than that of a hydraulic dynamometer of equivalent torque capacity. Further, inertia of the rotatory parts of these dynamometers is very high compared with that of an equivalent hydraulic dynamometer.

This high inertia has certain disadvantages:

(1) It can cause high torsional stresses in the prime mover shaft and/or in the drive shaft between prime mover and dynamometer with consequent and sometimes serious breakages.

(2) It limits cr complicates the range of adjustment of inertia for simulated acceleration tests.

(3) It can obscure certain engine faults for which the tester may be looking.

It is also known that the inductive lag in the field coils of these dynamometers can cause considerable time lags in the response of the dynamometer to a change of control signal.

The object of the present invention is to provide a hydraulic dynamometer, preferably of the Froude type, with controlling means capable of providing all the control characteristics that can be achieved with an electric or eddy-current dynamometer, but with the advantages of lower inertia and lower cost.

According to the present invention, a dynamometer system for testing a prime mover comprises a hydraulic dynamometer, means for measuring electrically or electronically the torque or speed or acceleration parameters of the dynamometer the means being connected to a circuit giving an output dependent upon the difference between a desired and the measured values of one of the said parameters, said output being applied to an electrically operated valve which operates on the dynamometer load absorption system so as to produce constant or substantially constant speed or torque or controlled acceleration of the dynamometer and prime mover on test. In a particular system embodying the invention there is provided a stabilising effect produced by rate feedback from the control fluid to the circuit providing an electric signal proportional to the rate at which the fluid pressure is changing. A shaping network when desired is arranged between the circuit and the electrically operable valve.

A further system embodying the invention includes programme control means comprising a closed loop servo control and a recording play-back unit, the servo being arranged to control the prime mover in dependence upon the difference between a desired value of a required parameter from the play-back unit and the corresponding measured value from the dynamometer. In this system the amplifier circuit gives an output dependent upon the difference between the desired value of another parameter from the play-back unit and the measured value from the dynamometer.

For the purpose of this specification the "measured value" of the dynamometer torque is an electric signal produced from a known force measuring device operatively connected to the dynamometer. The "measured value of speed" is the electrical signal proportional to the dynamometer speed produced by a speed measuring device which may be mounted directly on the dynamometer shaft. The "measured value" of acceleration is the output from a circuit giving the first differential of the measured speed. The "desired values" of torque, speed and acceleration are electric signals fed into the system at the controller.

Figure 3:
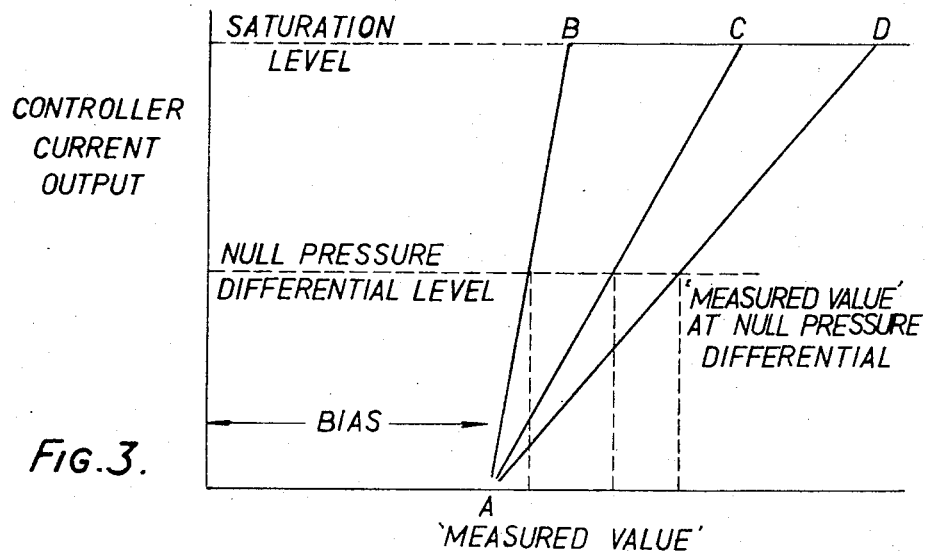
Figure 6:
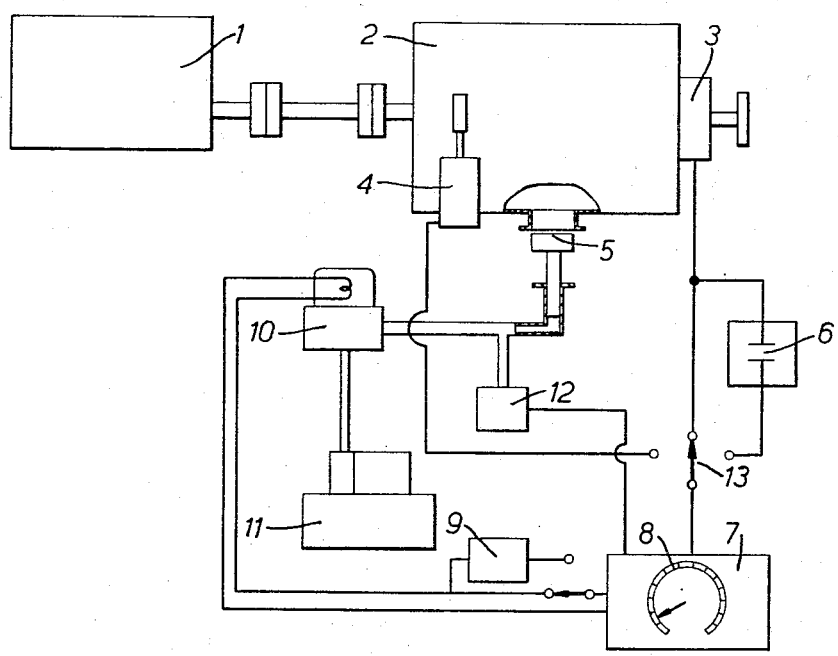
Figure 4:
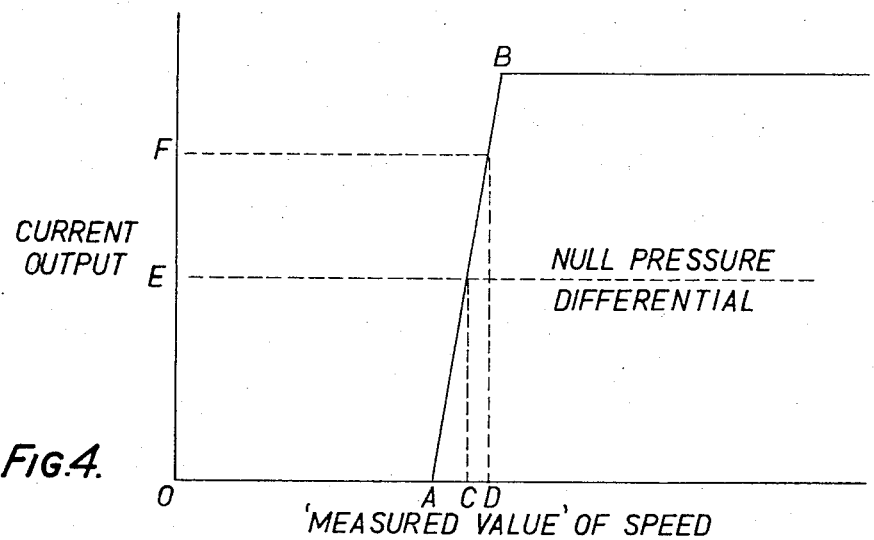
Figure 5:
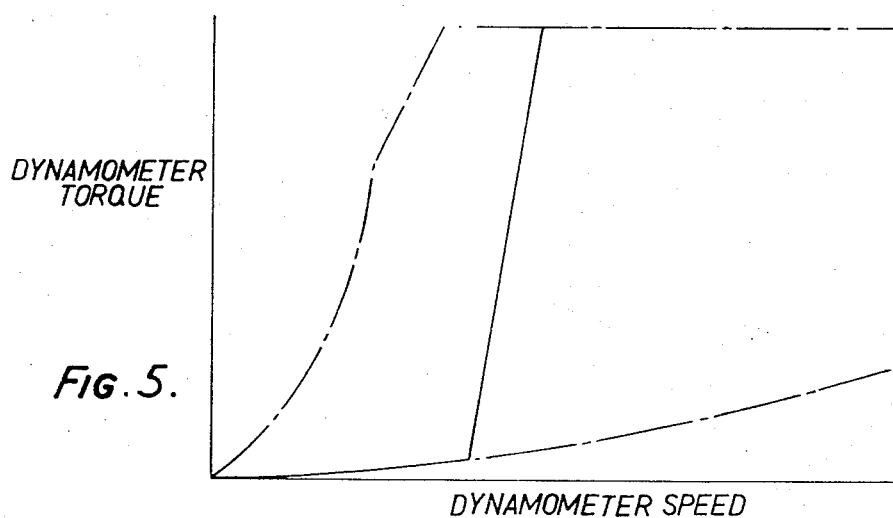
Figure 7:
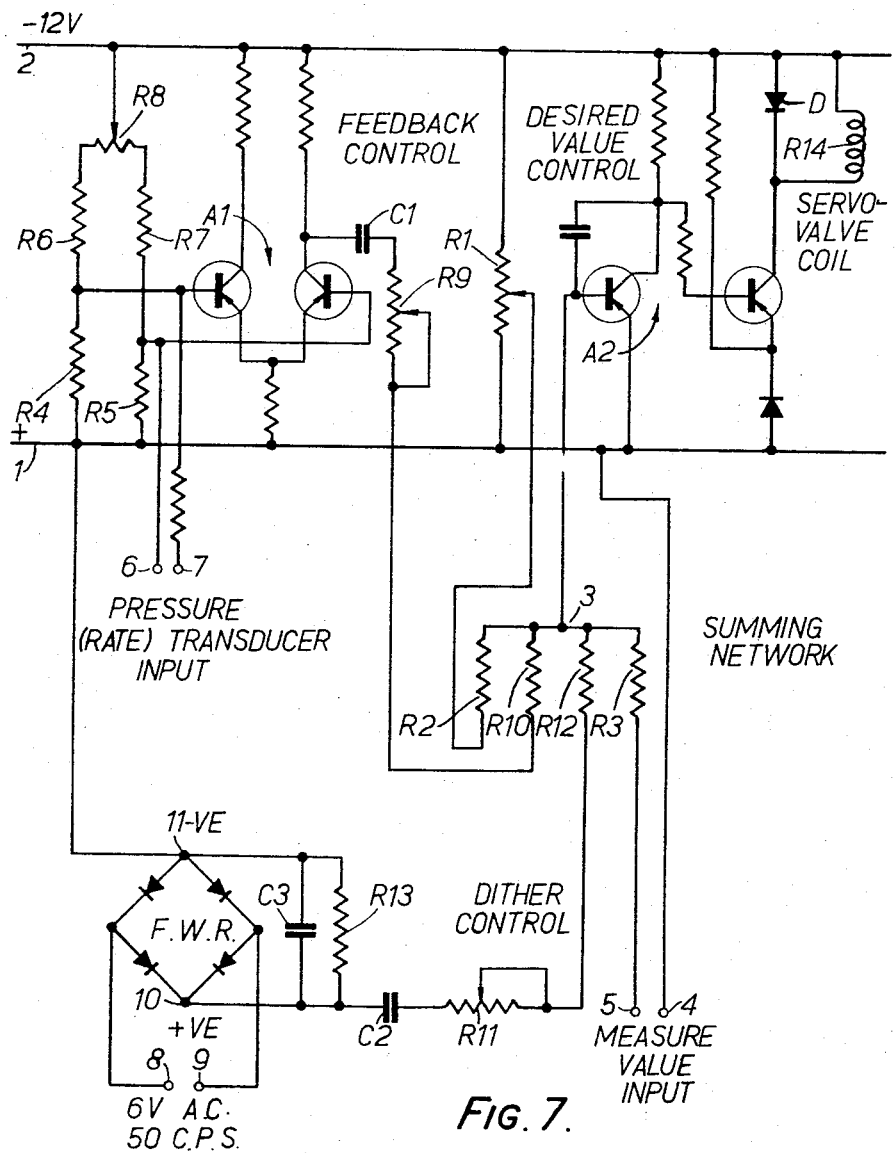
Figure 8:
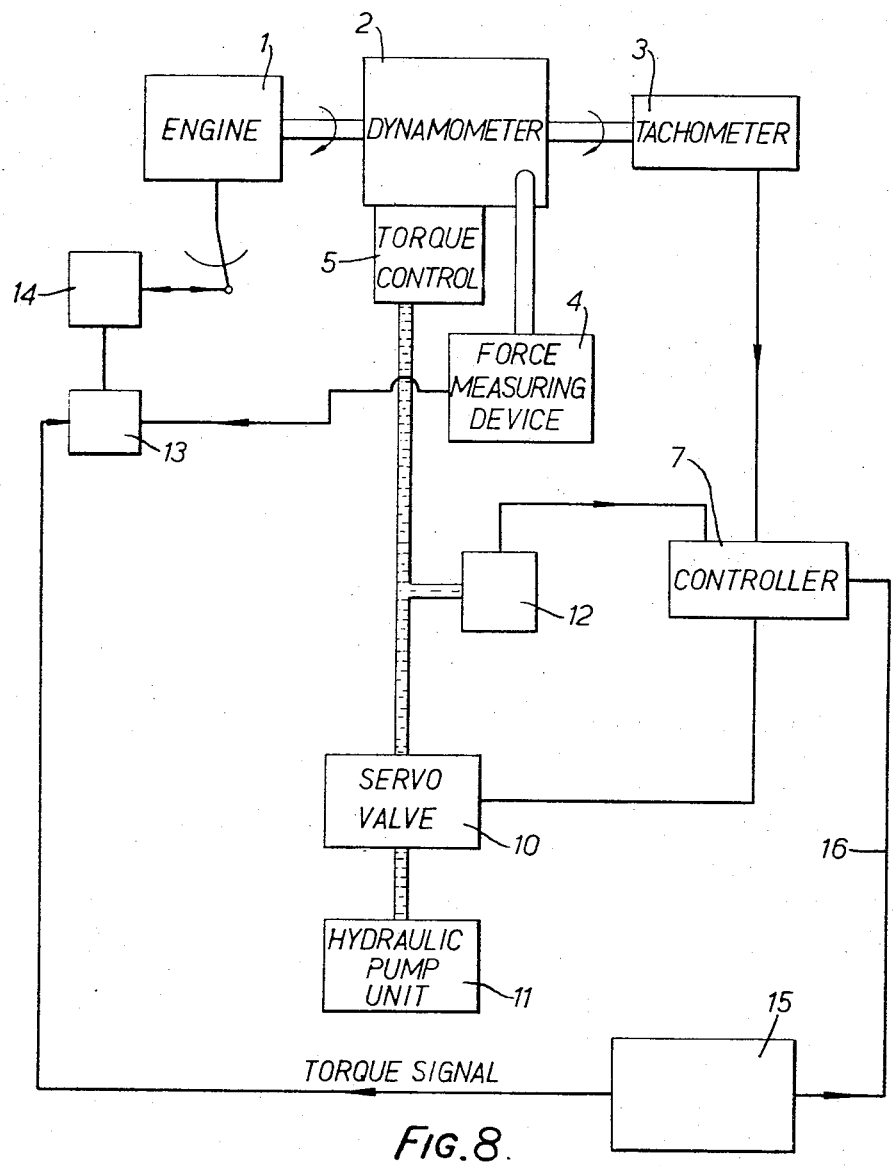

A particular system embodying the invention will now be described in greater detail by way of example with reference to the accompanying drawings in which:

FIGURE 3 shows curves giving the variation of "measured speed" with the controller current output, FIGURE 4 is generally similar to FIGURE 5 but includes additional illustration, FIGURE 5 shows the variation of "measured speed" with torque, FIGURE 6 is a block diagram illustrating one control system embodying the invention, FIGURE 7 is a circuit diagram of an appropriate form of controller; and FIGURE 8 is a block diagram showing a further system embodying the invention and including a programme control.

Referring firstly to FIGURE 6, a hydraulic dynamometer 2, driven by an engine 1 is rotatably supported in known manner so that the torque reaction arising from the internal hydraulic absorption of power can be externally transmitted to a force measuring device 4. This device 4 is of any known form as long as it can be adapted to directly or indirectly produce an electric signal proportional to the applied force. A speed measuring device 3 may be mounted on the dynamometer shaft and may be of any known type as long as it will directly or indirectly provide an electric signal proportional to dynamometer speed. A speed differentiating circuit 6 gives the measured value of acceleration.

The measured value of torque, or speed or acceleration may be fed into a controller 7 by means of a three-way switch 13. The "measured" value of the required parameter, torque speed or acceleration is supplied to the controller 7 and compared with the "desired" value of the same parameter. A particular form of controller will be described hereinafter with reference to FIGURE 7.

The output signal from the controller 7 which is dependent upon the difference between the "measured" and "desired" values of the selected parameter may be supplied either direct to servo-valve 10 or by way of a shaping network 9, which can be used to modify the output to any desired function of the "measured" value of the said parameter.

The servo-valve 10 is of the electro-hydraulic type in which a small electrical current passing through a coil produces a pressure differential across the spool of a hydraulic valve, the resulting movement of the spool directing the flow of pressurised hydraulic fluid from the hydraulic pump unit 11 to the outlet port or ports.

In carrying out the present invention a servo-valve is used as a pressure control instead of in its more usual application as a flow control device, and the electrical signal produces a hydraulic pressure in the outlet port or ports proportional to the current input.

The dynamometer absorption control 5, is preferably, but not exclusively of the back pressure valve type described in British patent specification No. 473,270 and which may have either a differential or single acting control piston. When a single acting control piston is used, one of the control pressure lines from this servo-valve 10 is blocked or returned to the pump unit 11.

Referring to FIGURES 6 and 3, the operation of the preferred form of control will now be described in greater detail using the speed control function as an example.

The "measured value" of dynamometer speed is applied to the input of the amplifier stage in controller 7. The "desired value" of dynamometer speed is set by a potentiometer 8 of the controller 7, and this biases the amplifier so that no current flows in the output circuit of the controller 7, until the "measured value" of dynamometer speed exceeds the "desired value." With further increase in "measured value," the output current from the controller 7 or shaping network 9, increases at a rate dependent upon the gain control setting, until the amplifier saturation level is reached. This level is decided by the output circuit limitations. Referring to FIGURE 3 the output will follow line AB at maximum gain setting and lines AC, AD etc., for lower gain settings. The servo-valve 10, is biased, either electrically, or mechanically such that a preselected current output from controller 7 or network 9, is required to give a null pressure output. For current output below this value, the pressure output is zero allowing the back pressure valve 5 to open fully and reduce dynamometer load to a minimum. Current output above this value will close the back pressure valve 5, and increase dynamometer load.

It is well-known that such a control system as that described may become unstable under certain conditions. This instability may be corrected by many of the well-known stabilized circuits. A particular form of stabilising circuit is shown in FIGURE 6 consisting of a rate feed back from the hydraulic control fluid pressure in such a manner as to apply a correcting signal proportional to the rate at which the control oil pressure is changing. The manner in which this is carried out will now be described with reference to FIGURE 6. A pressure transducer 12 is fitted in the control fluid pressure line and the electrical signal obtained is differentiated and fed back into a summing network in the control amplifier, to be described, in a sense which will tend to oppose the control signal.

When an electro-hydraulic servo-valve is used as a pressure control device, the hysteresis of the valve becomes an appreciable percentage of the control and it has been found desirable to introduce a substantial "dither" into the electrical control signal. This "dither" consists in the preferred form of a 100 cycle sinusoidal wave form applied to the summing network.

The controller 7 may take the form of any of several known types. In the simplest arrangement, a variable D.C. reference current representing the "desired" value may be applied to one side of the differentially wound coil of a servo-valve 10, the "measured" value being applied to the other side of the coil. In this arrangement, when the "measured" value of current is lower than the reference, the hydraulic output will be zero, causing the dynamometer to absorb minimum load. When the "measured" value current is higher than the reference, the pressure output will be such as to produce a load absorption at the dynamometer proportional to the difference between the "measured" and reference values.

The system as just described has certain limitations in the degree of control that may be obtained and a preferred form of controller embodying an amplifier is shown in FIGURE 7.

FIGURE 7 shows 12 volt positive and negative input lines 1 and 2 across which is a potentiometer R1 from which is taken a desired value of a required parameter through a resistor R2 included in a summing network comprising also resistors R3, R10 and R12. The measured value of the same parameter is fed in at terminals 4 and 5 giving a voltage between line 1 and the tapping 3 on the summing network through the resistor R3. A pressure rate transducer feed back is represented in FIGURE 8 by numeral 12 and this provides an input to terminals 6 and 7. This input signal is fed into a transistorised bridge amplifier indicated generally at A1 having its input balanced by a potentiometer system connected between lines 1 and 2 and including resistors R4, R5, R6, R7 and R8. A sliding contact on resistor R8 is preset to give balance and to allow for any variation in the characteristics of the transistors in the amplifier A1. The output from amplifier A1 is the feed back control to the summing network and is fed to the tapping 3 through a capacitance/resistance circuit including capacitor C1 and resistors R9 and R10.

There is also fed to the summing network a "dither" consisting of 100 cycle sinusoidal wave. A 6 volt A.C., 50 cycle per second source is fed in at terminals 8 and 9 to a full wave rectifier FWR terminal 11 of which is joined to line 1. The other terminal 10 of the full wave rectifier is connected via capacitor C2 "dither control," variable resistor R11 and resistor R12. Between the terminals 10 and 11 is a smoothing circuit including capacitor C3 and resistor R13.

The signal from the tapping 3 is fed into a two-stage transistorised amplifier indicated generally at A2, the output of which is fed into the coil R14 of the servo-valve. The diode D between the output of the amplifier A2 and the line 2 serves as a protective device for the amplifier A2.

Various applications of the control will now be described.

Speed control

Under speed control, the measured value" of dynamometer speed is fed into the controller 7, which is set at high gain to produce a steep torque/speed characteristic, such as is shown by the line AB in FIGURES 3 and 4.

Referring to FIGURE 4, the bias is set at a value OA. When the measured value equals OC, the current output from the controller 7, will be such as to give a null pressure signal to the piston of the back pressure valve 5. In this condition any water pressure in the dynamometer casing (casing pressure) will cause the back pressure valve 5, to open fully and the torque absorbed to be at the minimum hydraulic capacity. A small increase in speed, CD, will by virtue of the high gain of the amplifier, result in a large increase in current output EF, and a corresponding unbalance in the pressure across the back pressure valve 5, causing it to close and increase the casing pressure and hence the dynamometer power absorption. The relationship between speed and torque resulting from this mode of control is shown in FIGURE 5. It will be seen that a large variation in dynamometer torque gives rise to only a small variation in dynamometer speed. The "desired value" of dynamometer speed is selected by the bias potentiometer 8, or by other methods to be described later.

Any desired function connecting speed and torque can be obtained by use of suitable shaping networks, and amplifier gain, for example, a square law speed/torque characteristics of the form; Torque=$K.N.^2$ may be achieved by using a shaping network 9, the output of which is the square of the input. The value K is altered by varying the amplifier gain.

Torque control

Under torque control the "measured value" of dynamometer torque is fed into the controller 7, a constant torque characteristic, or any desired relationship between torque and speed can be obtained, the controlling sequence being similar to that described for speed control.

Inertia simulation

Inertia may be simulated using the same control circuit as has already been described for speed control, by including differentiating circuit 6, between the speed measuring device 3 and the controller 7. With this arrangement, the dynamometer torque will be proportional to the rate of change of speed; the magnitude of this torque, representing the inertia of the system being accelerated is selected by the gain setting of the controller 7.

In a comprehensive engine test plant it is desirable to control speed and torque, and to be able to vary the desired values" in any predetermined minner. The way in which this may be achieved will now be described using as an example the programming of an automobile engine to reproduce, on a test bed, the identical sequence of speed and torque values that occur on the road for a given journey.

Referring now to FIGURE 8, recording apparatus, which may for instance be a tape recorder is installed in an automobile and used in conjunction with appropriate measuring devices to record torque and engine speeds during the desired journey. This recording is then played back on a playback unit 15, and supplies the "desired values" of torque and speed.

In the preferred form, the torque signal from the recorder playback unit 15 is fed into any known form of closed loop servo 13, the output of which controls the positions of the throttle 14 of engine 1. The output from the servo 13 is dependent upon the difference between the "desired" torque value from the unit 15 and the "measured" value from the force measuring device 4. The speed signal from the recorder is used to bias the controller 7 via lead 16 in place of the potentiometer 8, described previously.

It is therefore clear that the present invention can be readily adapted to provide any desired relationship of torque, speed and acceleration, with respect to time. Further the satisfactory operation of the present invention when used as a sequence control does not depend upon the prime mover throttle or control being operated in the manner described in the preferred example.

One of the advantages of the control described is that it has a very high response rate and that the response rate is not appreciably altered by the size of the dynamometer, whereas with eddy-current or electric machines the inductive lag increases proportionally to the maximum power absorption of the machine.

A further advantage is that a control embodying the invention may be applied to very large hydraulic dynamometers of a size where it would be impractical or uneconomic to produce an eddy-current or electric machine, and that for a hydraulic machine the physical dimensions of the rotating parts are considerably smaller, thus allowing higher rotational speeds to be attained.

We claim:

1. A dynamometer system, for testing a prime mover, of the type including a hydrokinetic dynamometer having a water outlet and a load absorption system comprising a control fluid pressure line and a back pressure valve for variably adjusting the flow of water through said water outlet and a control system which comprises in combination:
   (a) electrical dynomometer characteristic measuring means arranged and adapted to provide a first electrical signal representative of a measured variable operating parameter of said dynamometer,
   (b) means providing a second electrical signal representative of a desired corresponding operating parameter of said dynamometer,
   (c) an electrical controller,
   (d) first connecting means between said measuring means and said controller whereby said controller provides an electrical output signal dependent upon the difference between said measured parameter signal and said desired parameter signal,
   (e) second connecting means connecting said controller output to an electrically operated pressure control servo-valve which is operative upon said back pressure valve, and
   (f) stabilizing means in the form of rate feedback means comprising a pressure transducer fitted in said control fluid pressure line and adpated to provide a third electrical signal representative of the rate of pressure change of the control fluid, and third connecting means between said transducer and said controller.

2. A system according to claim 1 in which said dynamometer characteristic measuring means includes torque measuring means, speed measuring means and acceleration measuring means, said first connecting means selectively connecting the electrical signal from one of said means to said controller.

3. A system according to claim 2 in which said second connecting means includes a shaping network.

4. A dynamometer system for testing a prime mover which includes a hydrokinetic dynamometer having a water outlet and a load absorption system comprising a control fluid pressure line and a back pressure valve for variably adjusting the flow of water through said outlet and a control system comprising in combination:
(a) first and second dynamometer characteristic measuring means arranged and adapted to provide first and second measured electrical signals representative of a first and a second measured variable operating parameter of said dynamometer,
(b) a recording playback unit providing first and second desired electrical signals representative of first and second desired operating parameters which correspond to said first and second measured parameters,
(c) an electrical controller connected to said first measuring means and to said playback unit, said controller providing an electric output signal representative of the difference between said first measured signal and said first desired signal,
(d) an electrically operated pressure control servo- valve connected to said output signal and operative upon said back pressure valve,
(e) a closed loop servo-control connected to said second measuring means and to said playback unit, said servo-control providing a controlled output for controlling the prime mover in dependance upon the difference between said second measured signal and said second desired signal.

5. A system according to claim 4 including stabilising means in the form of rate feedback means comprising a pressure transducer fitted in said control fluid pressure line and adapted to provide an electric feedback signal representative of the rate of pressure change of the control fluid, and connecting means between said transducer and said controller.

References Cited
UNITED STATES PATENTS

| | | | |
|---|---|---|---|
| 2,882,721 | 4/1959 | Harned et al. | 73—116 |
| 2,924,095 | 2/1960 | Worstell | 73—116 |
| 3,016,739 | 1/1962 | Jonach et al. | 73—116 |
| 3,050,993 | 8/1962 | Draughon et al. | 73—116 |
| 3,050,994 | 8/1962 | Heigl et al. | 73—117 |
| 3,064,470 | 11/1962 | Stevko | 73—116 |
| 3,138,954 | 6/1964 | Evans et al. | 73—116 |

RICHARD C. QUEISSER, *Primary Examiner.*

JAMES J. GILL, *Examiner.*

J. W. MYRACLE, *Assistant Examiner.*